(12) United States Patent
Bandy et al.

(10) Patent No.: US 10,748,352 B2
(45) Date of Patent: Aug. 18, 2020

(54) SYSTEMS AND METHODS FOR REMOTELY TRIGGERED DATA ACQUISITION

(71) Applicant: SIKORSKY AIRCRAFT CORPORATION, Stratford, CT (US)

(72) Inventors: Isaac Bandy, Eden Prairie, MN (US); Seth W. Mason, Orange, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 193 days.

(21) Appl. No.: 15/557,881

(22) PCT Filed: Jan. 15, 2016

(86) PCT No.: PCT/US2016/013655
§ 371 (c)(1),
(2) Date: Sep. 13, 2017

(87) PCT Pub. No.: WO2016/148771
PCT Pub. Date: Sep. 22, 2016

(65) Prior Publication Data
US 2018/0053356 A1 Feb. 22, 2018

Related U.S. Application Data

(60) Provisional application No. 62/134,180, filed on Mar. 17, 2015.

(51) Int. Cl.
*G07C 5/00* (2006.01)
*H04Q 9/04* (2006.01)
(Continued)

(52) U.S. Cl.
CPC ............. *G07C 5/008* (2013.01); *G06F 17/40* (2013.01); *G07C 5/085* (2013.01); *G07C 5/0808* (2013.01); *G08C 25/04* (2013.01); *H04Q 9/04* (2013.01)

(58) Field of Classification Search
CPC ...... G07C 5/008; G07C 5/0808; G07C 5/085; G06F 17/40; H04Q 9/04; G08C 25/04
(Continued)

(56) References Cited

U.S. PATENT DOCUMENTS 6,947,997 B2 9/2005 Tang et al.
7,013,210 B2 3/2006 McBrien et al.
(Continued)

FOREIGN PATENT DOCUMENTS

EP 2584465 A1 4/2013
EP 2608188 A1 6/2013

OTHER PUBLICATIONS

Extended European Search Report; EP 16765369; dated Sep. 18, 2018; 9 pages.
(Continued)

*Primary Examiner* — Jaime Figueroa
(74) *Attorney, Agent, or Firm* — Cantor Colburn LLP

(57) ABSTRACT

A method of data acquisition for health management of systems is provided. The method includes receiving, at a remote node, analog data from one or more sensors configured to monitor a health characteristic of a system, converting, at the remote node, the analog data into digital data, time stamping the digital data with the remote node, recording the digital data in a memory of the remote node, wherein the memory is a ring buffer, transmitting, from the remote node to a central device, requested digital data upon receiving a request related to a triggering event, and synchronizing the transmitted data at the central device based on the time stamp of the requested digital data to generate synchronized data.

13 Claims, 3 Drawing Sheets

(51) Int. Cl.
*G07C 5/08* (2006.01)
*G06F 17/40* (2006.01)
*G08C 25/04* (2006.01)

(58) Field of Classification Search
USPC ....................................................... 701/31.4
See application file for complete search history.

(56) References Cited

U.S. PATENT DOCUMENTS

| | | | | |
|---|---|---|---|---|
| 8,306,675 | B2 * | 11/2012 | Prus | G08G 5/0013 370/328 |
| 8,503,484 | B2 | 8/2013 | Bonk et al. | |
| 8,838,296 | B2 | 9/2014 | Fischer et al. | |
| 9,418,493 | B1 * | 8/2016 | Dong | G05B 23/0221 |
| 2004/0128039 | A1 * | 7/2004 | Podowski | G07C 5/008 701/33.4 |
| 2004/0176902 | A1 * | 9/2004 | McBrien | G01H 1/006 701/100 |
| 2007/0043533 | A1 | 2/2007 | Wiles et al. | |
| 2008/0045198 | A1 * | 2/2008 | Bhogal | G08G 5/0013 455/414.4 |
| 2009/0300379 | A1 * | 12/2009 | Mian | G01D 9/005 713/300 |
| 2010/0027768 | A1 * | 2/2010 | Foskett | G08G 5/0013 379/88.14 |
| 2011/0057830 | A1 * | 3/2011 | Sampigethaya | G01S 5/0072 342/36 |
| 2011/0282522 | A1 * | 11/2011 | Prus | G08G 5/0013 701/4 |
| 2012/0304164 | A1 * | 11/2012 | van der Zweep | G06F 9/44505 717/174 |
| 2012/0307050 | A1 | 12/2012 | Mimar | |
| 2013/0097414 | A1 * | 4/2013 | Bishop | G06F 9/44521 713/100 |
| 2013/0127636 | A1 | 5/2013 | Aryanpur et al. | |
| 2013/0158991 | A1 * | 6/2013 | Dong | G08G 5/0013 704/235 |
| 2014/0012954 | A1 | 1/2014 | Dorn et al. | |
| 2014/0036686 | A1 * | 2/2014 | Bommer | H04W 24/06 370/241 |
| 2014/0075506 | A1 * | 3/2014 | Davis | H04L 67/12 726/3 |
| 2014/0257624 | A1 * | 9/2014 | Safa-Bakhsh | G06F 17/00 701/31.4 |
| 2017/0178420 | A1 * | 6/2017 | Byrd, Jr. | G07C 5/008 |

OTHER PUBLICATIONS

International Search Report and Written Opinion; International Application No. PCT/US2016/013655; International Filing Date: Jan. 15, 2016; dated Apr. 11, 2016; 15 Pages.

* cited by examiner

SYSTEMS AND METHODS FOR REMOTELY TRIGGERED DATA ACQUISITION

CROSS REFERENCE TO RELATED APPLICATIONS

This application is a National Stage application of PCT/US2016/013655, filed Jan. 15, 2016, which claims the benefit of U.S. Provisional Patent Application No. 62/134,180, filed Mar. 17, 2015, both of which are incorporated by reference in their entirety herein.

GOVERNMENT RIGHTS STATEMENT

The present invention was made under contract W911W6-10-2-0006 awarded by the US Army. The Government has certain rights to the invention.

BACKGROUND OF THE INVENTION

Embodiments of this invention are directed to systems and methods for remotely triggered data acquisition.

Systems including, mechanical systems, machines, vehicles, structures, etc. including, but not limited to, vehicles and aircraft and component parts thereof, including, but not limited to, metals, composites, frames, hydraulics, engines, transmissions, air conditioning, lighting, etc. (hereinafter "system(s)") may include health management system(s) to monitor the health of the system. Health management systems may include sensors or other types of remote devices that are configured to measure and/or convey information regarding the status of the system to a processing device that is configured to monitor the health of the system. To enable such health management systems, communication lines and/or connections must be established between the remote devices and the processing device.

To enable the monitoring and running of algorithms upon received data, multiple wires may be required to be run from the various remote sources (sensors, etc.) to a single multiplexing analog data acquisition unit that is configured to convert multiple channels of about 1 kHz to about 100 kHz information into digital data, with higher acquisition rates possible and usable. The analog data is transmitted to the acquisition unit when triggered by logic that detects valid operational envelopes or triggering events. The logic is provided to address the variability in the data that would be present without such logic, i.e., the variability in the data is excessively large for useful diagnostics without such logic. When employed, for example, on aircraft, such systems require extensive wiring that adds additional weight and complexity to a system design. Such weight increases may be desired to be avoided.

In addition to extensive wiring associated with a plurality of sensors and other devices that may be employed for health monitoring, or other purposes, the sensors themselves will vary. For example, numerous individual and/or small form-factor sensors and related digitization equipment may be employed, thus adding additional complexity to the system. Communication to each and every device simultaneously, or substantially simultaneously, may be difficult.

BRIEF DESCRIPTION OF THE INVENTION

According to one embodiment, a method of acquiring data for health management of systems is provided. The method includes receiving, at a remote node, analog data from one or more sensors configured to monitor a health characteristic of a system, converting, at the remote node, the analog data into digital data, time stamping the digital data with the remote node, recording the digital data in a memory of the remote node, wherein the memory is a ring buffer, transmitting, from the remote node to a central device, requested digital data upon receiving a request related to a triggering event, and synchronizing the transmitted data at the central device based on the time stamp of the requested digital data to generate synchronized data.

In addition to one or more of the features described above, or as an alternative, further embodiments may include, wherein the time stamping and recording occur simultaneously.

In addition to one or more of the features described above, or as an alternative, further embodiments may include processing the synchronized data to obtain information regarding health characteristics of the system.

In addition to one or more of the features described above, or as an alternative, further embodiments may include updating a local clock at the remote node based on a communications protocol.

In addition to one or more of the features described above, or as an alternative, further embodiments may include determining a triggering event occurs, and sending the request based on determination that the triggering event occurs.

In addition to one or more of the features described above, or as an alternative, further embodiments may include, wherein the synchronized data is representative of one or more health characteristics of the system at the time of the triggering event.

According to another embodiment, a data acquisition system within a health management system is provided. The data acquisition system includes a first remote node having an analog-to-digital converter, a clock, and a ring buffer configured to store digital data, the first remote node configured to time stamp data that is stored in the memory and a second remote node having an analog-to-digital converter, a clock, and a ring buffer configured to store digital data, the second remote node configured to time stamp data that is stored in the memory. At least one first sensor is in communication with the first remote node, the at least one first sensor configured to monitor a health characteristic of a system. At least one second sensor is in communication with the second remote node, the at least one second sensor configured to monitor a health characteristic of the system. A central device is configured to receive digital data from at least the first remote node and the second remote sensor, the central device configured to synchronize the data received from the first and second remote nodes based on time stamps of the received data to generate synchronized data.

In addition to one or more of the features described above, or as an alternative, further embodiments may include, wherein the at least one first sensor is two or more sensors.

In addition to one or more of the features described above, or as an alternative, further embodiments may include one or more additional remote nodes, each additional remote node in communication with one or more additional sensors and in communication with the central device.

In addition to one or more of the features described above, or as an alternative, further embodiments may include a communication backbone configured between (i) the first and second remote nodes and (ii) the central device.

In addition to one or more of the features described above, or as an alternative, further embodiments may include a triggering unit configured to determine a triggering event and to send a request to at least one of the first remote node and the second remote node to obtain information related to the triggering event.

In addition to one or more of the features described above, or as an alternative, further embodiments may include, wherein the triggering unit and the central device are an integral unit.

In addition to one or more of the features described above, or as an alternative, further embodiments may include a processing unit configured to analyze the synchronized data.

In addition to one or more of the features described above, or as an alternative, further embodiments may include, wherein the processing unit and the central device are an integral unit.

In addition to one or more of the features described above, or as an alternative, the data acquisition system may be configured as part of a health and usage monitoring system of an aircraft.

Technical effects of embodiments of the invention include systems and methods of triggered data acquisition configured to provide a central triggering of multiple data sources associated with multiple sensors and/or types of sensors to obtain information therefrom.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
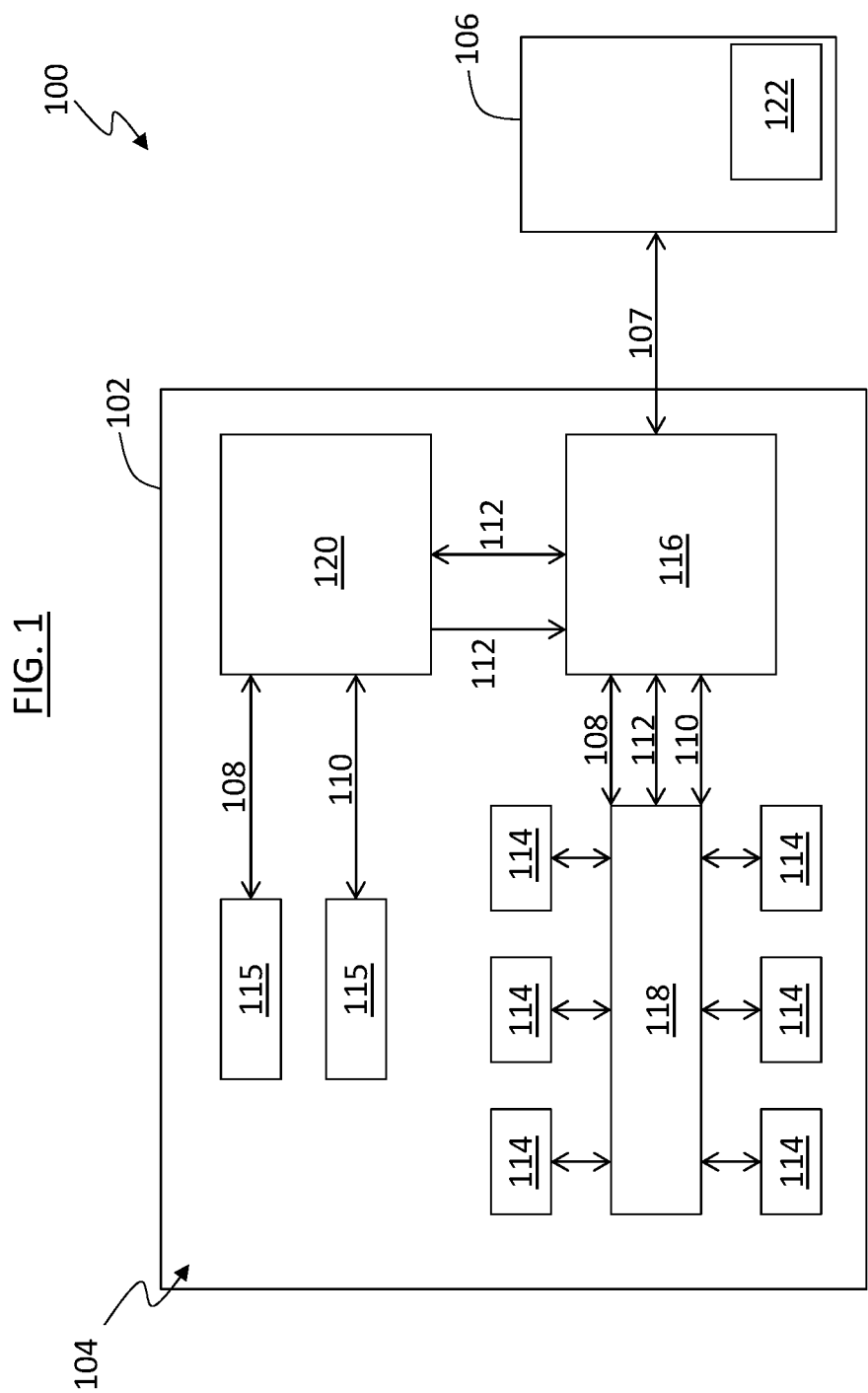
FIG. 1 is a block diagram schematic of a system in accordance with an exemplary embodiment of the invention.

FIG. 1 illustrates an exemplary data acquisition and health management system 100 that is configured for health monitoring of systems, e.g. mechanical systems, vehicles, aircraft, mechanical components and systems thereof, etc. (hereinafter "system(s)"). As shown, the health management system 100 is broken into two main subsystems. On the left of FIG. 1 is an On-Board System ("OBS") 104 that is configured on the system 102. The system 102 may be a vehicle, aircraft, or other structure or system that has health conditions (operational, structural, etc.) and it is desired to monitor various aspects of the system, such as structural health, operational conditions. On the right of FIG. 1 is a Ground-Based System ("GBS") 106. Although described herein as "on-board" and "ground-based," these terms are merely presented to be relative, and those of skill in the art will appreciate that the functionality of each system is important. In some embodiments, the GBS is a remote system that may not be "ground-based" and in some embodiments, the OBS may be integrated with a system. Thus the terminology of OBS and GBS is not intended to be limiting.

The OBS 104 and the GBS 106 are configured to communicate with each other through one or more communications mechanisms 107, such as Ethernet, wire communications, wireless communications, etc. The communications within the OBS 104 and the GBS 106, and the communication therebetween may employ conversion of multiple channels of about 1 kHz to about 100 kHz information into digital data, with higher acquisition rates possible and usable. Higher rates above 100 kHz may be advantageous to employ due to the digital nature of various embodiments of the invention.

The OBS 104 may be configured to employ a Health and Usage Monitoring System ("HUMS") architecture. A HUMS architecture enables health and system monitoring of the system 102 in order to provide information regarding the health and status of the system 102, including, for example, information related to operational modes and/or conditions. For example, the HUMS architecture may be configured to monitor for global vibration of the system 102, specific areas of vibration on or within the system 102, other types of operational or functional conditions, wear and tear, specific events, and/or operational health and conditions of the system 102.

The OBS 104 includes a network that interfaces with sensors and/or sensor data around and/or throughout the system 102. The network of the OBS 104 may include analog connections 108, digital connections 110, and Ethernet connections 112, as shown in FIG. 1. However, although illustratively shown as direct connections, those of skill in the art will appreciate that the above connections may be replaced by or supplemented by wireless communications, and/or other types of wired communications, thus the types of connections discussed herein are provided for illustrative and explanatory purposes.

The architecture of the OBS 104 includes software configured to enable efficient communication between various sensors 114 and a network acquisition and interface unit ("NAIU") 116 through a network backbone 118. The software includes interface software with the HUMS, a Prognostic and Health Monitoring Unit ("PHMU") card 120 having a real-time operating system, and the NAIU 116 that contains both a real-time operating system for real-time network management and processing as well as an operating system for hosting an on-board database and interfacing with the GBS 106. In some embodiments, the NAIU 116 may include an Ethernet switch and I/O processing card that can route various data using different protocols to the proper location within the software and/or hardware of the OBS 104, i.e., throughout the network in the OBS 104 and the GBS 106. For example, the NAIU 116 may employ a real-time operating system to handle, trigger, capture window, and preprocess data obtained from the sensors 114. In some embodiments, the NAIU 116 may include a multi-core processor.

The PHMU card 120 may be configured to interface with existing Ethernet signals of the system. In some embodiments, the PHMU card 120 is configured to host advanced technology software. The software of the PHMU card 120 may operate in cooperation with the NAIU 116, additional sensors 115, and other aspects of the OBS 104. In some embodiments, the sensors 114 and the sensors 115 may be the same, and in other embodiments, as shown, the sensors 114 and the sensors 115 may be separate. The configuration of the sensors 114, 115 and which device (NAIU 116 and PHMU card 120) the sensors 114, 115 may depend in part on the particular system in use.

Various health monitoring operations may be performed by or with the OBS 104. For example, individual diagnostic and parameter processing algorithms of the HUMS architecture of the OBS 104 may all be integrated together within the same HUMS for, e.g., detection and projection of failure modes and health of the overall system. Additionally, within the OBS 104, a reasoning algorithm may be configured to use a dependency model between diagnostic evidence and failure modes to isolate most likely root causes of the observed evidence in operation of the system 102.

As shown in FIG. 1, the GBS 106 is in communication with the OBS 104 using a communication mechanism 107, which may be wired or wireless. The GBS 106 may be configured to download information from the OBS 104 over the communication mechanism 107. Further, the GBS 106 may be configured for diagnostics employing algorithms and/or models, troubleshooting, and/or maintenance planning for the system 102 based on information obtained from the OBS 104.

The GBS 104 may include GBS components 122, such as software and hardware that are configured to interface with the OBS 104. In some embodiments, the components 122 may eliminate the need for data transfer via memory cards by employing an Ethernet-based web service, which, in some embodiments, may be a wireless interface with the OBS 104. The GBS 106 may also include other server infrastructure that may represent a location where ground-based diagnostics, prognostics, and maintenance planning tools can further reduce ambiguity, project future health, and use algorithmic techniques on historical data to better inform maintenance decisions regarding the system 102.

Those of skill in the art will appreciate that health management system 100 may be configured to monitor various health characteristics of a system. Such health characteristics may include structural health, operational health, etc. For example, mechanical diagnostics, bearing, and rotor balance algorithms that detect diagnostic features (a.k.a. condition indicators) designed to indicate when a part has failed or is failing may be employed. Another example may be power quality health, lighting operation, transmission operational health, etc. Further, algorithms configured to detect statistical anomalies in data, fault isolation reasoners to manage and reduce built-in-test and fault codes into likely sources of errors, ground-station software to process and display data taken on the system, and ground-based software architectures to integrate all of the above information, using various data models and schemas, may be employed without departing from the scope of the invention. The above listed examples are merely provided for illustrative purposes with respect to the use and additional components and features that may be incorporated and/or included in various embodiments of the invention.

Figure 2:
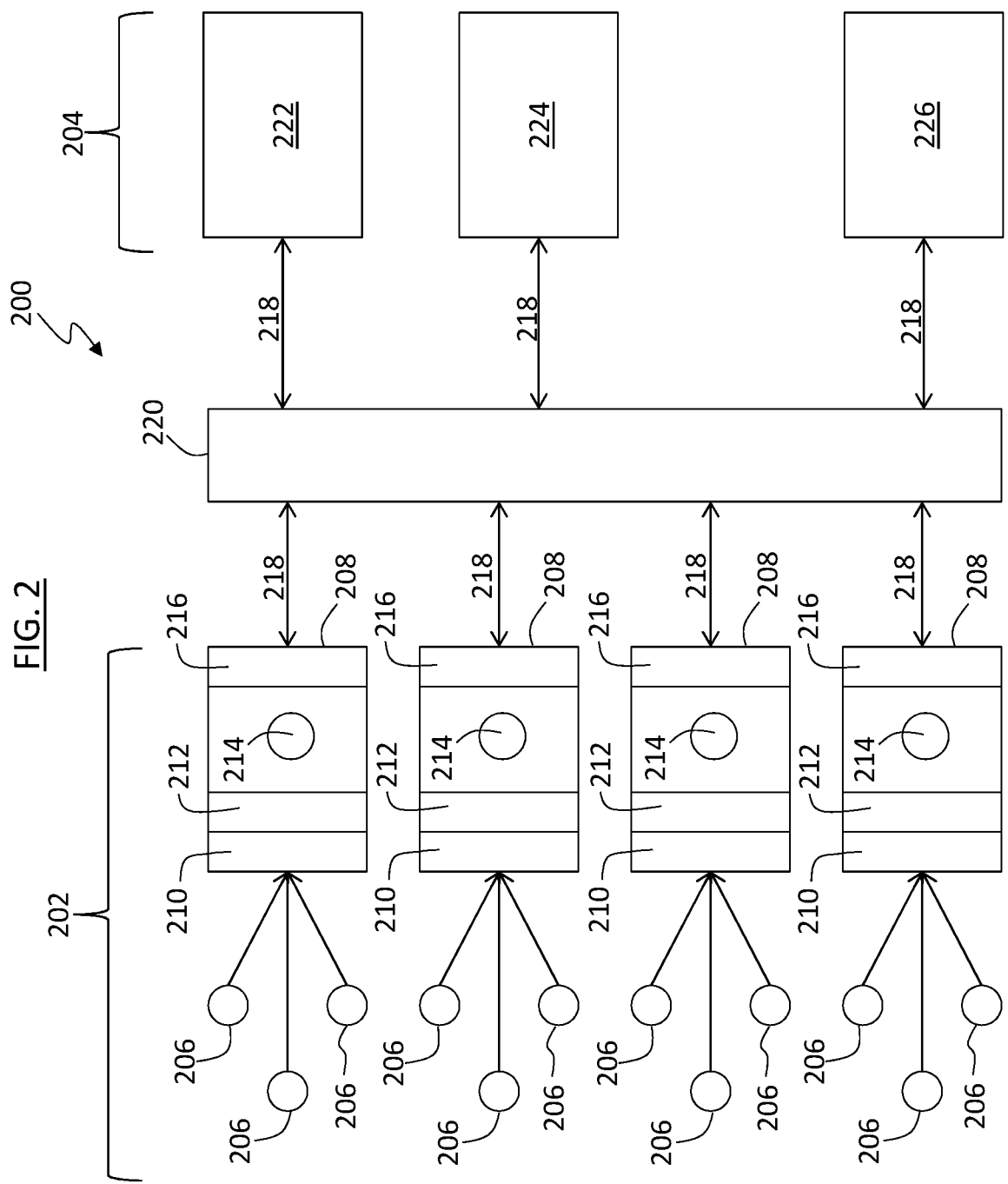
FIG. 2 is a schematic of a communications schema in accordance with an exemplary embodiment of the invention.

Turning now to FIG. 2, a schematic block diagram of an exemplary on-board system is shown. The system 200 may form an OBS as described above, or a sub-part of an OBS. The system 200 includes a data acquisition portion 202 and a data management portion 204.

The data acquisition portion 202 includes one or more sensors 206. The sensors 206 may be configured to generate and/or collect data related to various health monitoring characteristics, such as vibration, acceleration, temperature, pressure, strain, etc., of a system. The data may be collected in an analog format from the sensors 206 and conveyed to one or more remote nodes 208, which may be configured as data acquisition cubes or other remote devices configured for data storage, processing, etc.

Each remote node 208, as shown, includes an analog-to-digital ("A/D") converter 210. The A/D converter 210 is configured to receive as an input analog data or signals received from one or more sensors 206. The A/D converter 210 then converts the analog data or signals into digital data or digital signals. The digital signals can then be processed, stored, transmitted, etc. For example, as shown, each remote node 208 includes a ring buffer 212 that is configured to store information received from the A/D converter 210. Specifically, data that is converted from analog to digital in the A/D converter 210 is written to the ring buffer 212 and stored thereon. The ring buffer 212 is memory or digital storage media configured to be written or recorded with data from the A/D converter 210.

The ring buffer 212 operates as a first-in/first-removed digital storage device. For example, the ring buffer 212 records digital data from the A/D converter 210 in time-order. The ring buffer 212 may have a limited amount of storage space, and, thus, to continuously record data incoming from one or more sensors 206, the ring buffer 212 must delete, dump, or remove some of the stored information. Therefore, when the ring buffer 212 is filled to capacity and a data block is to be written, as received from the A/D converter 210, the oldest stored information in ring buffer 212 will be deleted. The now free or available space within the ring buffer 212 will be used to record or write the newest information received form the sensor(s) 206.

In some embodiments, the A/D converter 210 and the ring buffer 212 are first-in/first-removed devices. In other embodiments, the A/D converter does not include buffer or FIFO capabilities. In this situation, the A/D data is accessed, stored, moved, etc., in real-time from the A/D converter 210 to the ring buffer 212. In other embodiments, other types of A/D converters may include fixed buffer length that can overflow if not serviced adequately, and the system is configured appropriately.

In some embodiments, the ring buffer 212 may have a limited amount of storage space, but the space allocated (sizing) for storage is determined by the needs and interests of the downstream processing and data reconstruction algorithms of the system. In such embodiments, the ring buffer 212 may hold or retain a data set configured to meet a data period of interest plus the associated time stamp.

In some embodiments, a communication based event trigger is employed to halt the acquisition of data updates in the ring buffer 212. In such embodiments, this capability allows the downstream processing devices to schedule, access, and collect the pre-trigger data of interest from the remote nodes 208 in non-real-time. This capability, advantageously, reduces the required downstream system real-time throughput and bandwidth capacities. In other embodiments, a discrete trigger within the remote nodes 208 may be employed.

Thus, in various embodiments, ring buffer data could be immediately accessed (transmitted) upon request. In some embodiments, ring buffer data updates could be halted to freeze the ring buffer contents with a communication trigger allowing event ring buffer data to be later accessed and/or transmitted when convenient, i.e., when adequate processing time is available to the system.

The remote node 208 also includes a local clock 214. The local clock 214 of the remote node 208 is configured to enable time stamping of the recorded information in the ring buffer 212, such as by a processor or other device of the remote node 208. As discussed below, the time stamping enabled by the local clock 214 permits synchronicity of data collected by a network acquisition unit or other device of the data manage portion 204 of the system 200.

The remote node 208 further includes a controller 216 or other device that is configured control the remote node 208 and to communicate over communications lines 218, such as Ethernet lines, with a communication backbone 220, such as an Ethernet bus. For example, the controller 216 is configured to receive and update the local clock 214 and to issue commands to the ring buffer 212 of the remote node 208. In some embodiments, the controller 216 may receive a command from the data management portion 204 to transmit data at or from a specific time, such as an instance when a critical event may have occurred. The controller 216 may then instruct the ring buffer 212 to dump or supply data recorded thereon that is associated to the time or time frame of the request. In some embodiments, the controller 216 may be formed from one or more elements, including a processing unit, a data bus, an Ethernet protocol unit, and/or other elements known in the art and used for data transmission and/or processing.

Advantageously, as noted, the remote nodes 208 are configured to house or store digital data, converted from analog data, and then provide such information or data on an on-demand basis. Thus, there is no requirement in the system to transmit large amounts of analog data for processing to the data management portion 204 of the system 200. The data is transmitted through the communication backbone 220 to the data management portion 204 in digital format from the remote nodes 208. Accordingly, in some embodiments, the system may be utilized to employ processors and other components with less processing throughput capabilities, thus reducing costs, power requirements, etc. Further, as will be appreciated by those of skill in the art, a plurality of ring buffers 212 may be employed for each sensor 206. In such embodiments, multiple triggering events may be detected, and a particular data set may be maintained for each triggering event. The separate event data sets may then be accessed and/or transmitted collectively, in groups, or individually, and on demand.

As shown in FIG. 2, the data management portion 204 includes various components, although more or fewer components may be included without departing from the scope of the invention. For example, as shown, the data management portion 204 includes a triggering unit 222, a network acquisition and interface unit ("NAIU") 224, and a data processing unit 226.

The triggering unit 222 may be configured with memory and one or more processing units configured to identify when an event occurs such that information should be collected from one or more sensors 206, i.e., sensors configured to monitor aspects of a system related to the event. For example, an event may be an operational mode and it may be desirable to obtain information from sensor(s) 206 that provide data related to that operational mode. In one example, when the system is a helicopter, the operational mode may be "hover." In the hover state or mode, the triggering unit 222 can send a command through the communication backbone 220 over communications lines 218. The command may be sent to one or more remote nodes 208, wherein each remote node 208 is addressable by the triggering unit 222. The specific addressed remote nodes 208 that are associated with sensors 206 that collect data related to hover status will be the remote nodes 208 that are addressed by the triggering unit 222.

In some embodiments, for example, the triggering unit 222 may provide a command indicating a start time or instance when data should be collected from each of the remote nodes 208. The request will then be sent to each remote node 208 associated with the operational mode, and data collected therefrom. Because the remote nodes 208 may be located at different locations throughout the system, the arrival time and collection time of the data at a central processing unit, e.g., part of data management portion 204, may be out of sync. Thus, each data dump or block of data related to the request and sent from the remote nodes 208 will be transmitted to the NAIU 224 for assembly and synchronization. The NAIU 224 is configured to refer to the time stamps provided from each remote node 208 to synchronize the collected or received information. The NAIU 224 may then transmit the synchronized data over the communication backbone 220 to one or more data processing units 226 that are configured to process the synchronized data.

Although shown and described as a single configuration, those of skill in the art will appreciate that other configurations may be used without departing from the scope of the invention. For example, in an alternative embodiment, the NAIU 224 may be configured to have the trigger commands sent therefrom and/or therethrough, and then receive the triggered data, synchronize it, and send it on to the data processing unit 226. In such embodiments, the NAIU 224 may be configured as a gate for information transmitted between the collection points and the processing points, i.e., between (i) the sensors 206/remote nodes 208 and (ii) the data triggering unit 222/data processing unit 226. In some such embodiments, the triggering unit 222 and the data processing unit 226 may be configured as a single unit that monitors for events or operational modes, is triggered, sends a request for data, and then processes the received data, which has been synchronized due to the time stamps provided from the local clocks 214 at each remote node 208. Further, in some embodiments, each of the components of the data management portion 204 may be part of a single unit configured to perform each of the above processes/steps, rather than separated out as shown schematically in FIG. 2. Thus, FIG. 2 is not intended to be a limiting example, but rather is provided for illustrative and explanatory purposes.

Figure 3:
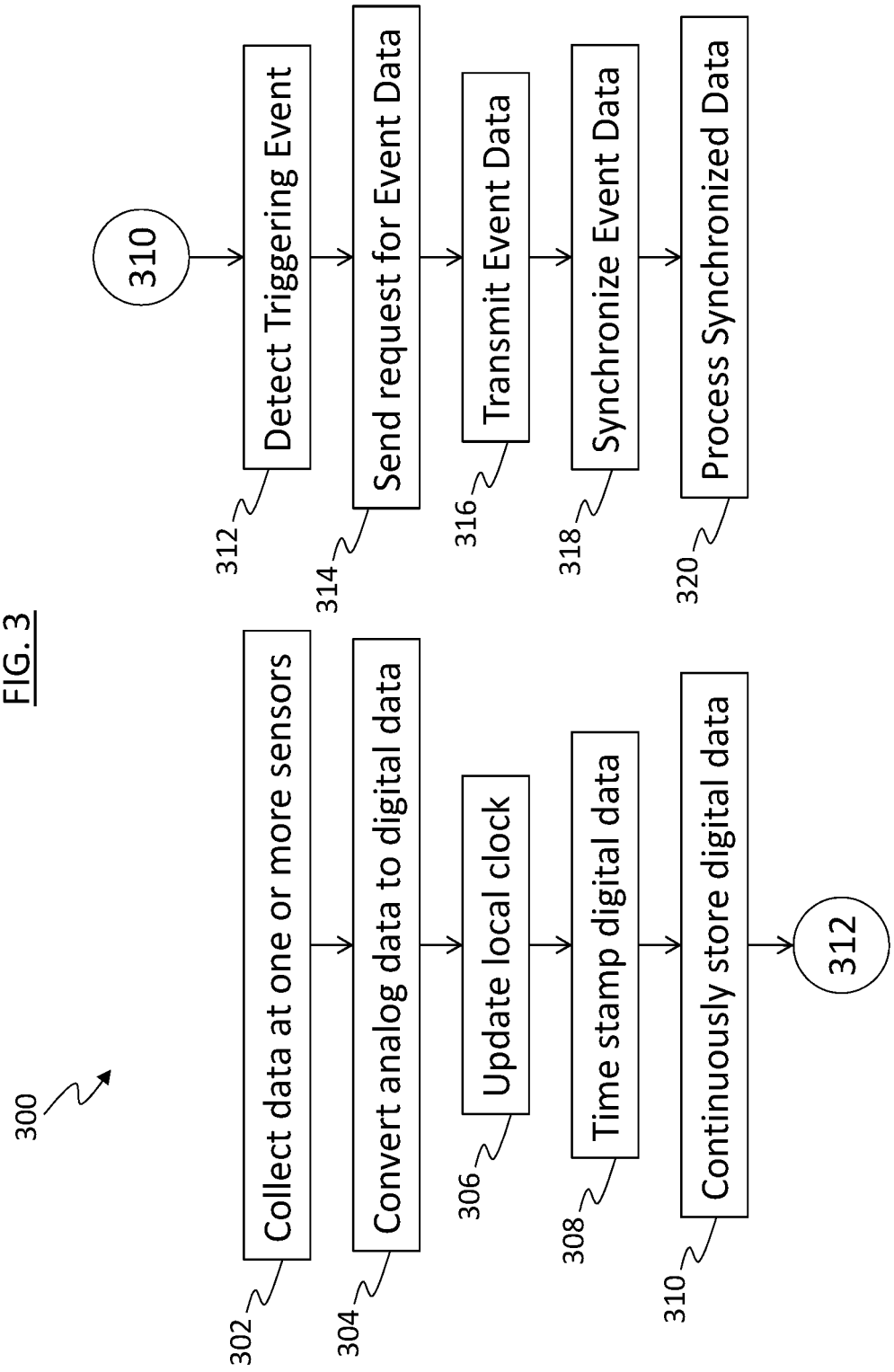
FIG. 3 is a process in accordance with an exemplary embodiment of the invention.

Turning now to FIG. 3, a process 300 in accordance with an exemplary embodiment is shown. At step 302, one or more sensors are configured to continuously monitor a characteristic of a system at a location on or in a system. In alternative embodiments, the monitoring may not be continuous. For example, in some embodiments, the one or more sensors may be configured to detect information when instructed by a command or may be configured to monitor the system periodically or upon some schedule.

At step 304, the data is transmitted to a local data acquisition device, such as a remote node described above. The local data acquisition device is considered local because it is relatively close to or in proximity with the one or more sensors. The local data acquisition device is configured to digitize the analog data received from the one or more sensors, when it is received therefrom.

At step 306, the local data acquisition device will update a local clock based on a protocol, such as an Ethernet time protocol. In some embodiments, this step may be optionally included or omitted. In other embodiments, the clock may be synchronized on command by the triggering unit or other device over the network backbone. In other embodiments, the clock may be synchronized on power-up and/or initialization using a network based time protocol.

At step 308, the local data acquisition device time-stamps the digital data that was converted from analog to digital at step 304.

At step 310, the time-stamped digital data is written into an overwriting ring buffer, on a first-in/first-removed basis.

Steps 302-310 of process 300 may be performed simultaneously and/or nearly simultaneously, or may be performed sequentially or in a different order than that shown in FIG. 3. Thus, FIG. 3 is provided for illustrative and explanatory purposes, and is not intended to be limiting to the order or timing of the various steps of the process 300. As discussed above, the overwriting ring buffer enables the digital data to be stored in a manner that is time sequential, such that the oldest data may be overwritten when the ring buffer capacity is reached. Thus, in some embodiments, based on the order of writing and time-stamping, the most recently obtained data may always be available. In alternative embodiments, based upon the nature of the triggering and acquisition, the data may be held in time if the remote note was triggered to stop acquisition. Alternatively, in some embodiments, it may be the latest data if data was directly requested from the remote node.

At step 312, a centralized interface unit, such as an NAIU or other device, detects when an operational regime or triggering event is experienced. Such regimes or events may require the collection of data from sensors throughout the system. Thus, at step 312, the recognition of an operational regime and/or triggering event may trigger the transmission of or the need to transmit the locally acquired data from appropriate remote nodes or local data acquisition devices.

At step 314, to achieve the acquisition of data, the centralized interface unit sends a message to the remote nodes requesting information related to the triggering event or operational regime. In some embodiments, the request may be used to trigger the remote node to halt data acquisition, for later retrieval, or the request may be a request for immediate transfer of data that has been recorded.

The request may be addressed to all, some, or one of the remote nodes. The determination upon which remote nodes are to be addressed may be predetermined based on the type of operational regime and/or the type of triggering event. Further, the request may seek specific data and/or types of data from the remote nodes. For example, the request may seek only vibration data from a subset of the remote nodes. Thus tailoring the on-demand request of data for a specific purpose is enabled. Further, the request may be tailored to a specific instance in time and/or time period. Thus, the request may include an indication that all data recorded from a certain time or time period should be transmitted or sent to the NAIU or other device.

At step 316, the remote nodes respond with data corresponding to the request, e.g., data type, time frame, etc.

The data is time stamped, as noted above (step 308). When the requested data is received at the NAIU or other device, the data may arrive at different times, and thus may not be adequately organized, aligned, synchronized, etc. for data processing. Thus, at step 318, the NAIU or other device will synchronize the data related to the operational regime and/or triggering event based on the time stamps from step 308.

The synchronized data can then be processed at step 320.

Advantageously, in some embodiments, messages are communicated using high-speed Ethernet. Further, in such embodiments, time synchronization may be enabled using an Ethernet-based time protocol. Advantageously, system latency and/or jitter requirements of Ethernet-based time protocols may not be required to be strict because the data is aligned during subsequent processing, i.e., at the NAIU. Further, advantageously, in some embodiments, the system may be utilized to employ processors and other components with less processor throughput capabilities, thus reducing costs, power requirements, etc. This is enabled by the reduction in the required network and/or communication bandwidth of the invention. That is, a less powerful processor can be used in various embodiments because the processor does not have to simultaneously acquire data from analog sources and send it over a communications link.

Further, advantageously, to enable an efficient system that is catered to the particular application and/or system that is monitored, buffers and overall system bandwidth may be sized appropriately. That is, embodiments of the invention may be applied and used within systems of any bandwidth and buffer constraints, and is thus not limited by such aspects of the system.

Further, advantageously, various embodiments of the invention distribute the acquisition of analog data to remote nodes that include software and hardware that continuously operates as a local ring buffer and provides the buffered data upon request. The data, which is converted from analog to digital, is precision time-stamped to enabled post-processing alignment with data from other sources, i.e., from other local ring buffers in the system. Time stamping may be done via Ethernet time protocol to eliminate the need for specialized timing wiring and protocols. In some embodiments, advantageously, the software in the remote data acquisition nodes may be executable binary, and the code source may be portable C code, or mostly-portable C code, that does not rely on specialized digital signal processing or low-level hardware. Further, low level implementations using field programmable gate arrays and/or application specific integrated circuits may be employed. In some embodiments, depending on the requirements of the system, a hardware implementation may be used rather than a microprocessor/digital signal processing based configuration.

Advantageously, various embodiments disclosed herein may be used for various types of data. Alternatively, a single system may be used for multiple types of data, each relating to various structural and operational health aspects of a system. For example, systems in accordance with various embodiments of the invention may be used for 100,000 S/s vibration data, 1,000 S/s flight control servo/pump data, 20 S/s temperature data, and/or other various types of data related to operational modes and/or structural health of the system, including information related to discrete events.

Further, advantageously, embodiments of the invention provide that data of multiple types can be commanded from a central triggering device over a flexible and scalable Ethernet interface to multiple locations. Further, when the data from all over the system is received at a central location, subsequent processing into diagnostic indications may be assisted by synchronization in accordance with the invention.

Further, advantageously, embodiments of the invention may provide flexibility with respect to real-time processing requirements. Traditional systems operate in strict real-time processing. However, flexibility and relaxation of the real-time processing requirements by using the triggered requests and buffered data allow post resynchronization of the acquired data, and thus strict real-time processing is not a mandatory requirement of the system in accordance with various embodiments of the invention.

Often times it is not known whether the system, e.g., an aircraft, was in a trigger condition, e.g., hover, until sometime after the event occurs. This is because of the algorithmic techniques that are used to detect certain conditions, such as entry phenomena, characteristic phenomena, and exit phenomena into, during, and after a trigger condition are all analyzed together to make an assessment of if the trigger condition was present or not. The processing and communication of these algorithms takes a positive amount of time (sometimes significant), adding to the delay between the true trigger condition and the realization by a trigger detector that the condition was present and then the command sent to acquire data from the time period of that trigger condition. Doing all of this in real-time may not be practical for many prior systems, and not even possible for other prior systems. However, advantageously, embodiments of the subject invention make it practical and possible using the distributed architecture and circular/ring buffer data queues disclosed herein.

Further, advantageously, as noted above, real-time data processing and transmission may be eliminated by various embodiments of the invention. Thus, the entire data flow, of the data collected from various sensors, does not need to be managed and/or transmitted all at the same time in real-time. Advantageously, in some embodiments of the invention, a processing element may run a trigger algorithm that could use a packet-based network to request an already-queued set of data from another element, and then send that data to yet another element for health management processing. Further, limited trigger-based flow of data, as enabled herein, allows a system with less performance and complexity demands than a solution that would require the entire flow of data in real-time.

Advantageously, various embodiments of the invention enable optimal or optimized acquisition of data (e.g., lowest cost and weight solution) in a system, such as a vehicle (especially a flying vehicle where weight and cost are very important), and then the final algorithms of the data can be processed on a GBS, where, perhaps the data from a given flight or flight condition can be combined with data from other flights or other flight conditions that would be impractical or impossible to implement within a software/processor in the OBS.

While the invention has been described in detail in connection with only a limited number of embodiments, it should be readily understood that the invention is not limited to such disclosed embodiments. Rather, the invention can be modified to incorporate any number of variations, alterations, substitutions, combination, sub-combination, or equivalent arrangements not heretofore described, but which are commensurate with the spirit and scope of the invention. Additionally, while various embodiments of the invention have been described, it is to be understood that aspects of the invention may include only some of the described embodiments.

For example, although various embodiments have been shown and described, these detailed embodiments are provided for explanatory and illustrative purposes. Alterations in configurations, structures, and applications may be appreciated by those of skill in the art, without departing from the scope of the invention. Further, although Ethernet has been discussed with respect to the above embodiments, those of skill in the art will appreciate that other communications protocols may be employed without departing from the scope of the invention.

Further, for example, although described with respect to vehicles, and particularly, aircraft, those of skill in the art will appreciate that systems that are monitored for health may be any operational system, such as building systems, vehicle systems, power systems, tools, equipment, etc. Thus, the invention is not limited to the provided example, rather the example is provided for explanatory and illustrative purposes. Accordingly, as will be appreciated by those of skill in the art, the GBS or Ground-Based System may be a part of the health management system that is remote from the OBS or On-Board System. In some embodiments, the two systems may be integrated into a single health management system.

Accordingly, the invention is not to be seen as limited by the foregoing description, but is only limited by the scope of the appended claims.

What is claimed is:

1. A method of acquiring data for health management of systems, the method comprising:
   continuously receiving, at a remote node, analog data from one or more sensors configured to monitor a health characteristic of a system;
   converting, at the remote node, the analog data into digital data;
   time stamping the digital data with the remote node;
   recording the digital data in a memory of the remote node, wherein the memory is a ring buffer;
   detecting, at a central device, a triggering event at the system, the triggering event being associated with the digital data at the remote node for a specified time period;
   transmitting, from the remote node to the central device, digital data from the specified time period; and
   synchronizing the transmitted data with the triggering event at the central device based on the time stamp of the requested digital data.

2. The method of claim 1, wherein the time stamping and recording occur simultaneously.

3. The method of claim 1, further comprising processing the synchronized data to obtain information regarding health characteristics of the system.

4. The method of claim 1, further comprising updating a local clock at the remote node based on a communications protocol.

5. The method of claim 1, wherein the synchronized data is representative of one or more health characteristics of the system at the time of the triggering event.

6. A data acquisition system for health management of systems, the data acquisition system comprising:
   a first remote node having an analog-to-digital converter, a clock, and a ring buffer configured to continuously collect and store digital data, the first remote node configured to time stamp data that is stored in the memory;
   a second remote node having an analog-to-digital converter, a clock, and a ring buffer configured to continuously collect and store digital data, the second remote node configured to time stamp data that is stored in the memory;
   at least one first sensor in communication with the first remote node, the at least one first sensor configured to monitor a health characteristic of a system;
   at least one second sensor in communication with the second remote node, the at least one second sensor configured to monitor a health characteristic of the system;
   a triggering unit configured to determine a triggering event and to send a request to at least one of the first remote node and the second remote node to obtain information related to the triggering event; and
   a central device configured to receive digital data from at least the first remote node and the second remote sensor for a selected time period associated with the triggering event, the central device configured to synchronize the data received from the first and second remote nodes with the triggering event based on time stamps of the received data to generate synchronized data.

7. The data acquisition system of claim 6, wherein the at least one first sensor is two or more sensors.

8. The data acquisition system of claim 6, further comprising one or more additional remote nodes, each additional remote node in communication with one or more additional sensors and in communication with the central device.

9. The data acquisition system of claim 6, further comprising a communication backbone configured between (i) the first and second remote nodes and (ii) the central device.

10. The data acquisition system of claim 6, wherein the triggering unit and the central device are an integral unit.

11. The data acquisition system of claim 6, further comprising a processing unit configured to analyze the synchronized data.

12. The data acquisition system of claim 11, wherein the processing unit and the central device are an integral unit.

13. The data acquisition system of claim 6, configured as part of a health and usage monitoring system of an aircraft.

* * * * *